United States Patent
Beidas

(10) Patent No.: US 11,581,921 B2
(45) Date of Patent: Feb. 14, 2023

(54) LINE-OF-SIGHT MULTI-INPUT MULTI-OUTPUT ENABLED MULTIBEAM SATELLITE SYSTEM

(71) Applicant: Bassel F Beidas, Germantown, MD (US)

(72) Inventor: Bassel F Beidas, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 17/136,680

(22) Filed: Dec. 29, 2020

(65) Prior Publication Data

US 2022/0209828 A1    Jun. 30, 2022

(51) Int. Cl.
*H04B 7/185*    (2006.01)
*H04B 7/0413*   (2017.01)

(52) U.S. Cl.
CPC ....... *H04B 7/0413* (2013.01); *H04B 7/18513* (2013.01)

(58) Field of Classification Search
CPC ........ H04B 7/19; H04B 7/185; H04B 7/0413; H04B 7/0626; H04B 7/18513; H04L 1/00; H04L 5/00; H04L 5/007; H04L 25/03; H04L 27/26; H04W 28/02; H04W 40/36; H04W 72/04; H04W 72/08; H04W 84/06; H04W 88/06

USPC ........ 370/208, 252, 316; 375/219, 260, 267, 375/295, 316, 341; 455/13.1, 552.1
See application file for complete search history.

(56) References Cited

U.S. PATENT DOCUMENTS

2008/0247351 A1* 10/2008 Dankberg .......... H04B 7/18534
                                                        370/316
2016/0006500 A1*  1/2016 Radpour ............... H04W 28/16
                                                        370/319

FOREIGN PATENT DOCUMENTS

EP    3484067 A1    5/2019

OTHER PUBLICATIONS

A.K. Sarangi, "Capacity Comparison of SISO, SIMO, MISO & MIMO System", IEEE, Oct. 11, 2018 (Year: 2018).*

(Continued)

*Primary Examiner* — Shawkat M Ali
(74) *Attorney, Agent, or Firm* — Capitol City TechLaw; Jasbir Singh

(57) ABSTRACT

The present teachings disclose a multibeam satellite system and methods that can achieve orthogonality between spatially multiplexed signals in a multi-input multi-output (MIMO) configuration when operating in line-of-sight (LOS) uplink and downlink channels on the feeder link side, using essentially a common spot beam. The teachings maximize a MIMO capacity across multiple frequency bands by disclosing an antenna array geometry for disposition on-board a single satellite and for a ground segment.

10 Claims, 8 Drawing Sheets

(56) References Cited

OTHER PUBLICATIONS

Angeletti Kiero et al: "On ground beam forming techniques for mobile satellite systems applications" In: "Cooperative and Cognitive Satellite Systems", Jan. 1, 2015 (Jan. 1, 2015), Elsevier, XP055918687, ISBN: 978-0-12-799948-7, pp. 155-194, DOI: 10.1016/B978-0-12-799948-7.00005-0.
Angeletti Piero et al : "A Pragmatic Approach to Massive MIMO for Broadband Communication Satellites", IEEE Access, IEEE, USA, vol. 8, Jul. 16, 2020 (Jul. 16, 2020), pp. 132212-132236, XP011801154, DOI: 10.1109/ACCESS. 2020. 3009850 [retrieved on Jul. 27, 2020] abstract sections—VII; Figures 1-6, 19, 20.
International Search Report for PCT Application PCT/US2021/062978.

\* cited by examiner $$202 \quad \underline{y}_u = \mathbf{H}_u \cdot \underline{x}_g + \underline{w}_u \quad (1)$$

$$204 \quad h_{m,n} = a_{m,n} \cdot e^{-j\frac{2\pi}{\lambda_c}r_{m,n}} \quad (2)$$

$$206 \quad C_u = \log_2\left(\det\left(\mathbf{I}_{N_R} + \rho_u \cdot \mathbf{H}_u \mathbf{H}_u^H\right)\right) \quad (3)$$

$$208 \quad \underline{\tilde{x}}_g = \mathbf{G}_{\text{pre}} \cdot \underline{x}_g \quad (4)$$

$$210 \quad \underline{y}_g = \left(\mathbf{H}_u \cdot \mathbf{G}_{\text{pre}}\right) \cdot \underline{x}_g + \underline{w}_u \quad (5)$$

$$212 \quad \mathbf{G}_{\text{pre}} = \mathbf{H}_u^H \cdot \left(\mathbf{H}_u \mathbf{H}_u^H\right)^{-1} \quad (6)$$

$$214 \quad \mathbf{G}_{\text{pre}} = \mathbf{H}_u^H \cdot \left(\mathbf{H}_u \mathbf{H}_u^H + \mathbf{I}\right)^{-1} \quad (7)$$

$$216 \quad \mathbf{G}_{\text{pre}} = \mathbf{H}_u^H \cdot \left(\mathbf{H}_u \mathbf{H}_u^H + \beta \cdot \mathbf{I}\right)^{-1} \quad (8)$$

$$218 \quad \underline{y}_g = \mathbf{H}_d \cdot \underline{x}_s + \underline{w}_d \quad (9)$$

$$220 \quad h_{m,n} = a_{m,n} \cdot e^{-j\frac{2\pi}{\lambda_c}r_{m,n}} \quad (10)$$

$$222 \quad C_d = \log_2\left(\det\left(\mathbf{I}_{N_R} + \rho_d \cdot \mathbf{H}_d \mathbf{H}_d^H\right)\right) \quad (11)$$

$$224 \quad \underline{\tilde{y}}_g = \mathbf{G}_{\text{post}} \cdot \underline{y}_g \quad (12)$$

$$226 \quad \underline{\tilde{y}}_g = \left(\mathbf{G}_{\text{post}} \cdot \mathbf{H}_d\right) \cdot \underline{x}_s + \mathbf{G}_{\text{post}} \cdot \underline{w}_d \quad (13)$$

$$228 \quad \mathbf{G}_{\text{post}} = \left(\mathbf{H}_d^H \mathbf{H}_d\right)^{-1} \cdot \mathbf{H}_d^H \quad (14)$$

$$230 \quad \mathbf{G}_{\text{post}} = \left(\mathbf{H}_d^H \mathbf{H}_d + \mathbf{I}\right)^{-1} \cdot \mathbf{H}_d^H \quad (15)$$

$$232 \quad \mathbf{G}_{\text{post}} = \left(\mathbf{H}_d^H \mathbf{H}_d + \beta \cdot \mathbf{I}\right)^{-1} \cdot \mathbf{H}_d^H \quad (16)$$

FIG. 2

LINE-OF-SIGHT MULTI-INPUT MULTI-OUTPUT ENABLED MULTIBEAM SATELLITE SYSTEM

FIELD

Spatial orthogonality of independent signals transmitted in MIMO-enabled satellite systems with LOS channels is achieved, when these signals use the same time-frequency resources. A single satellite with multiple reflector antennae may be used to minimally increase a cost of the satellite system. For a given geographic area, more gateways may be placed with acceptable interference levels among them. In some embodiments, a reliance on diversity gateways is reduced.

BACKGROUND

Prior Art MIMO systems require channels that are scatter-rich, such as typically found in terrestrial wireless networks. Some prior art satellites systems use MIMO for low-earth orbit (LEO) applications as they would still benefit from scatter-rich environment, resulting from Ricean fading with low Rice factor. Some other prior art satellites systems use multiple satellites with one MIMO antenna disposed on each satellite, a very costly alternative. In contrast, LOS conditions, rather than scatter-rich, are encountered in geostationary satellite systems traditionally limiting the usefulness of MIMO.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a multibeam satellite system that can achieve orthogonality between spatially multiplexed signals in a multi-input multi-output (MIMO) configuration when operating in line-of-sight (LOS) uplink and downlink channels on a feeder link side, using essentially a common spot beam. The teachings maximize a MIMO capacity across multiple frequency bands by disclosing an antenna array geometry for disposition on-board a single satellite and for a ground segment.

A system of one or more computers can be configured to perform particular operations or actions by virtue of having software, firmware, hardware, or a combination of them installed on the system that in operation causes or cause the system to perform a method for providing Multi-Input Multi-Output (MIMO) feeder uplinks for a satellite. The method including separating X satellite antennae on the satellite, pre-interference processing Y gateway uplink Tx signals to generate Y antennae uplink signals that minimize channel interference for a MIMO reception at the X satellite antennae, and disposing Y ground antennae such that a MIMO transmission of the Y antennae uplink signals by the Y ground antennae is spatially orthogonal upon the MIMO reception at the X satellite antennae, where X is greater than 1, Y is greater than 1, the X satellite antennae are dominant line-of-sight (LOS) of the Y ground antennae, and a channel capacity of the MIMO transmission is greater than a channel capacity of Y Single-Input Single-Output (SISO) transmissions.

In some embodiments, the method for the uplinks may include one or more of the following. The method may include transmitting the Y antennae uplink signals as the MIMO transmission; and receiving the MIMO transmission at the satellite. The method where the pre-interference processing is based on one or more of, a weighted or non-weighted version of, a zero-forcing (ZF) criteria, a minimum mean-square error (MMSE) criteria, or a regularized ZF (RZF) criteria. The method where the Y ground antennae are spaced within an acceptable range of an optimal position. The method where the satellite includes a GEO satellite having a bent-pipe design, an on-board processing design, a transparent payload design, a regenerative payload design or a combination thereof. The method where X and Y are equal. The method where the pre-interference processing mitigates interference in a presence of an additive white Gaussian noise (AWGN) vector. The method where the pre-interference processing is based on a linear operation multiplying the Y antennae uplink signals with a matrix or a linear combination of the Y antennae uplink signals. The method where the ground antennae are interconnected via a fiber or microwave link. The method where the pre-interference processing is based on high-quality channel state information (CSI) about the propagation of the MIMO transmission. Other technical features may be readily apparent to one skilled in the art from the following figures, descriptions, and claims.

A system of one or more computers can be configured to perform particular operations or actions by virtue of having software, firmware, hardware, or a combination of them installed on the system that in operation causes or cause the system to perform a method for providing Multi-Input Multi-Output (MIMO) feeder downlinks for a satellite. The method including separating X satellite antennae on the satellite, disposing Y ground antennae such that a MIMO transmission by the X satellite antennae is spatially orthogonal upon a MIMO reception of Y antennae downlink signals by the Y ground antennae, and post-interference processing the Y antennae downlink signals to generate Y gateway downlink signals that minimize channel interference for the MIMO reception at the Y ground antennae, where X is greater than 1, Y is greater than 1, the Y ground antennae are dominant line-of-sight (LOS) of the X satellite antennae, and a channel capacity of the MIMO transmission is greater than a channel capacity of X Single-Input Single-Output (SISO) transmissions.

In some embodiments, the method for the downlinks may include one or more of the following. The method may include transmitting the MIMO transmission via the X satellite antennae; and receiving the MIMO transmission as the Y antennae downlink signals. The method where the Y ground antennae are spaced within an acceptable range of an optimal position. The method where the satellite includes a GEO satellite having a bent-pipe design, an on-board processing design, a transparent payload design, a regenerative payload design or a combination thereof. The method where X and Y are equal. The method where the post-interference processing mitigates interference in a presence of an additive white Gaussian noise (AWGN) vector. The method where the post-interference processing is based on a linear operation multiplying the Y antennae downlink signals with a matrix or a linear combination of the Y antennae uplink signals. The method where the post-interference processing is based on one or more of, a weighted or non-weighted version of, a zero-forcing (ZF) criteria, a minimum mean-square error (MMSE) criteria, or a regularized ZF (RZF) criteria. The method where the ground antennae are interconnected via a fiber or microwave link. The method where the post-interference processing is based on high-quality channel state information (CSI) about the propagation of the MIMO transmission. Other technical features may be readily apparent to one skilled in the art from the following figures, descriptions, and claims.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 2 illustrates an aspect of the subject matter in accordance with one embodiment.

Figure 1A:
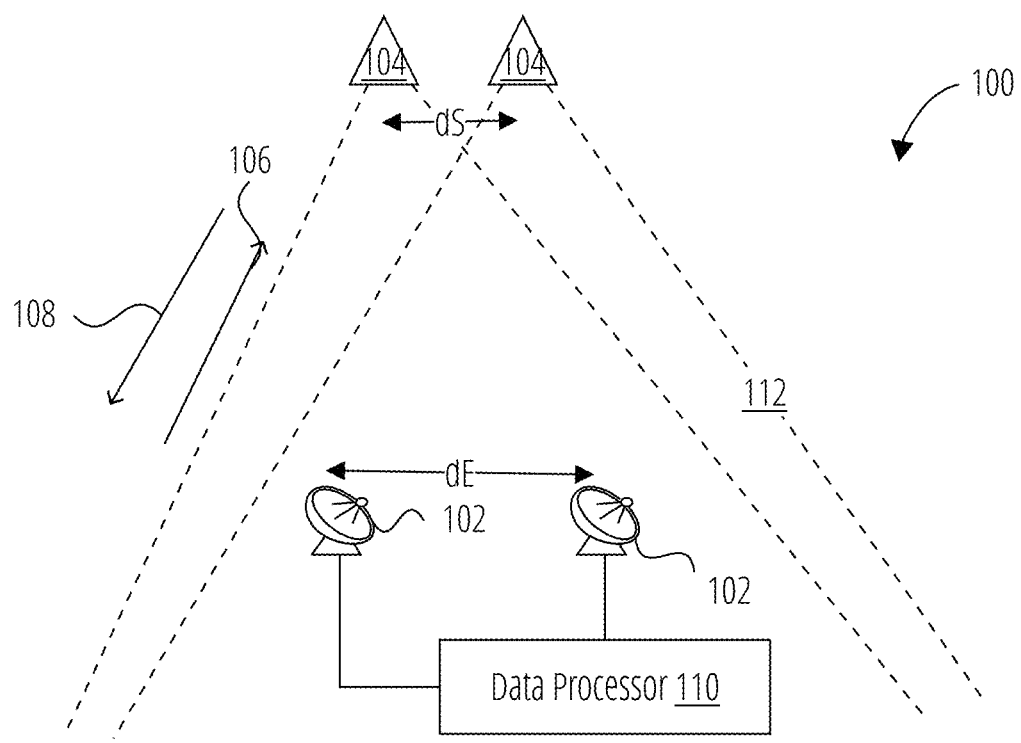
FIG. 1A illustrates a MIMO-enabled feeder link for multibeam satellite systems in LOS for a 2×2 case according to some embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

The present teachings disclose a multibeam satellite system that can achieve orthogonality between spatially multiplexed signals in a multi-input multi-output (MIMO) configuration when operating in line-of-sight (LOS) channels, using essentially a common spot beam. The teachings maximize a MIMO capacity across multiple frequency bands by disclosing an antenna array geometry for disposition onboard a single satellite and for a ground segment.

In some embodiments, linear pre-processing at the gateways spatially separates the multiplexed signals without requiring matrix processing onboard the satellite for the uplink of the forward direction. In some embodiments, for the downlink, linear post-processing at the gateways may spatially separate the multiplexed signals without requiring matrix processing onboard the satellite. The gateway-based linear processing enables MIMO in LOS with existing satellite bent-pipe architectures.

Significant gains are demonstrated when compared with systems that do not use this MIMO method, for example, about 125% improvement in capacity for a 2×2 MIMO over a conventional single-input single-output (SISO) system. The present teachings provide soft diversity to gain immunity against heavy rain attenuation.

Although the examples herein are based on a Geosynchronous Earth Orbit (GEO) satellite, they are also applicable to Low Earth Orbit (LEO) and Medium Earth Orbit (MEO) satellites as long as LOS channels, in particular, dominant LOS channels are used. In a dominant LOS channel, a free space signal from the transmitter to the receiver is stronger than a scattered space signal from the transmitter to the receiver.

FIG. 1A illustrates a MIMO-enabled feeder link for multibeam satellite systems in LOS for a 2×2 case in one embodiment.

FIG. 1A illustrates an exemplary satellite network 100 that implements feeder links using a 2×2 MIMO. Satellite network 100 includes two satellite antennae 104 at a satellite (not shown) separated by a distance $d_S$ that are radiating two highly overlapping beams 112. A ground portion of the satellite network 100 consists of two gateway antennae 102, separated by a distance $d_E$ and inter-connected to a data processor 110 at a data processing center. Each gateway antenna 102 serves both satellite antennae 104 simultaneously. Both uplinks 106 and downlinks 108 on the feeder side are provided by the beams 112. In some embodiments, the gateway antennae 102 are multi-feed antennae. In some embodiments, the satellite antennae 104 are multi-feed antennae.

Figure 1B:
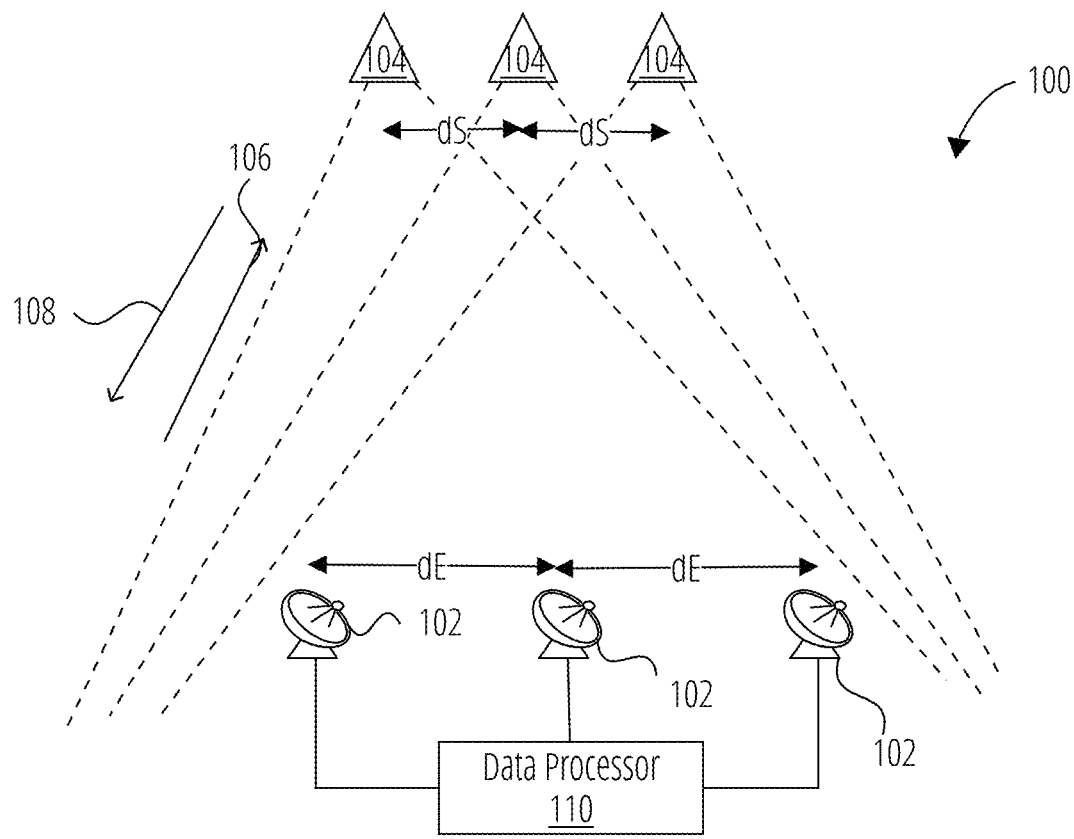
FIG. 1B illustrates a MIMO-enabled feeder link for multibeam satellite systems in LOS for a 3×3 case according to some embodiments.

FIG. 1B illustrates a MIMO-enabled feeder link for multibeam satellite systems in LOS for a 3×3 case in one embodiment.

FIG. 1B illustrates an exemplary satellite network 100 that implements feeder links using a 3×3 MIMO. Satellite network 100 includes three satellite antennae 104 at a satellite (not shown) separated by a distance $d_S$ that are radiating three highly overlapping beams 112. A ground portion of the satellite network 100 consists of three gateway antennae 102, separated by a distance $d_E$ and inter-connected to a data processor 110 at a data processing center. Each gateway antenna 102 serves the three satellite antennae 104 simultaneously. Both uplinks 106 and downlinks 108 on the feeder side are provided by the beams 112. The gateway antennae 102 are arranged on a straight line for illustration only; other arrangements are possible such as forming a triangle.

FIG. 2 illustrates mathematical equations for MIMO feeder links according to various embodiments.

A MIMO uplink operation—gateway antennae 102 to satellite antennae 104—may be mapped by an expression 202, an expression 204, an expression 206, an expression 208, an expression 210, an expression 212, an expression 214, and an expression 216. A MIMO downlink operation—satellite antennae 104 to gateway antennae 102—may be mapped by an expression 218, an expression 220, an expression 222, an expression 224, an expression 226, an expression 228, an expression 230 and an expression 232.

Figure 3:
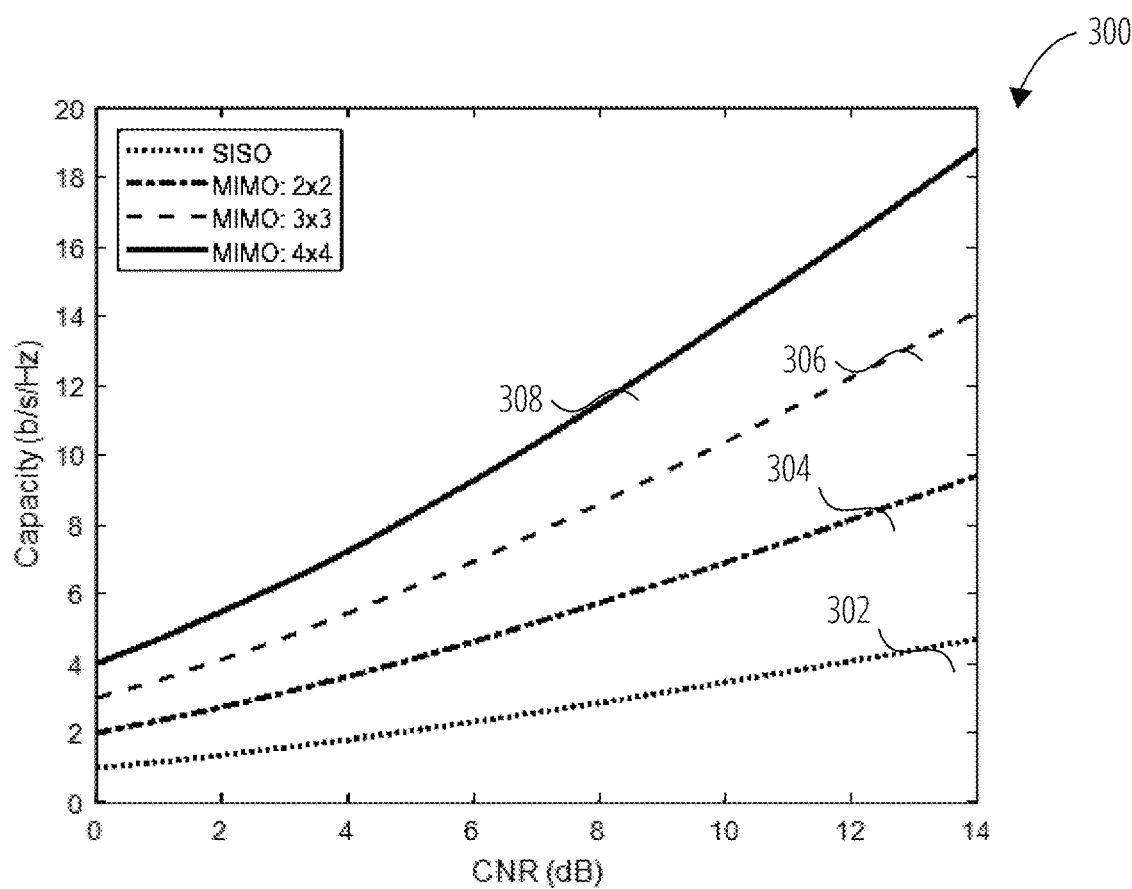
FIG. 3 illustrates a maximum MIMO capacity that is achieved for different choices of the number of transmit and receive antennae according to some embodiments.

FIG. 3 illustrates a maximum MIMO capacity that is achieved for different choices of the number of transmit and receive antennae according to some embodiments.

FIG. 3 illustrates a maximum capacity achievable for different counts of transmit and receive antennae. The capacity plot 300 comprises capacities for a SISO 302, a MIMO 2×2 304, a MIMO 3×3 306, and a MIMO 4×4 308 configuration. In FIG. 3, Carrier to Noise Ratio (CNR) is scaled by the number of antennae to show that capacity increase is achieved purely from gain in spatial degrees of freedom. The capacity plot 300 illustrates channel capacity increases over a Single-Input Single-Output (SISO) system. The capacity plot 300 also illustrates that channel capacity increases, more or less linearly, with an increase in the MIMO order. For example, at 4 bits/sec/Hz, a 12-dB improvement is achieved by using a 4×4 MIMO when compared to the SISO scenario.

Ground-Based Pre-Interference Processing for the Uplink

Figure 4:
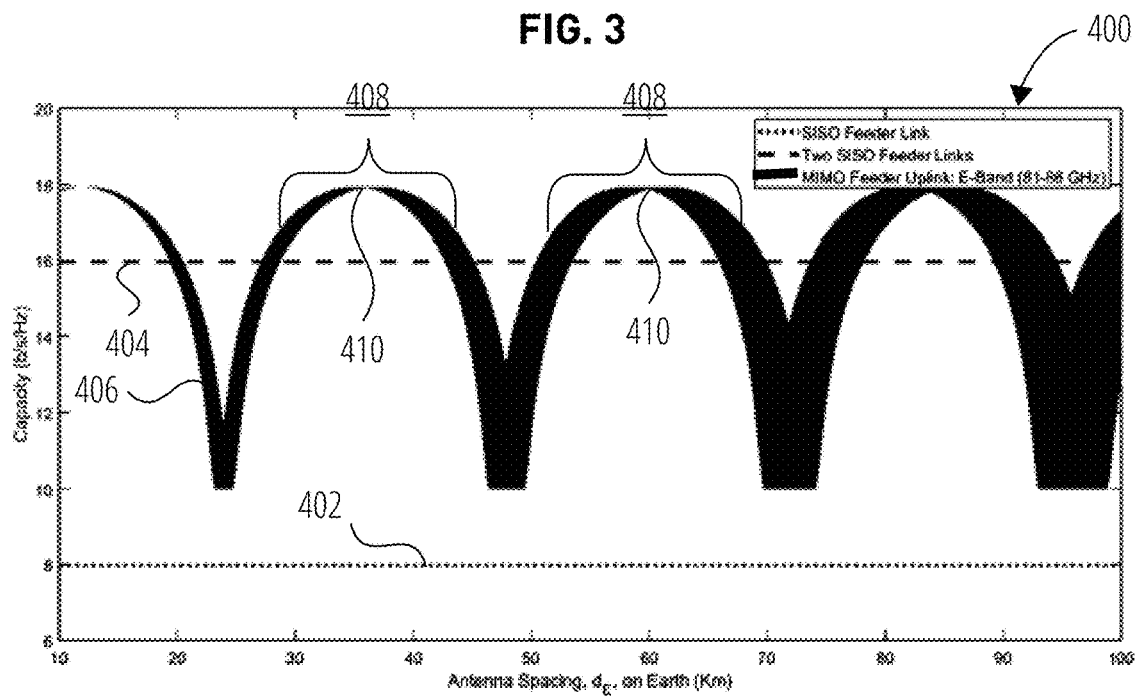
FIG. 4 illustrates a capacity of a 2×2 MIMO as a function of distance between the ground antennae on an uplink in the forward direction according to some embodiments.

FIG. 4 illustrates a capacity of a 2×2 MIMO as a function of distance between the ground antennae on an uplink in the forward direction according to some embodiments.

Traditionally, LOS channels, encountered in geostationary earth orbit (GEO) satellite systems, have been disregarded as being able to achieve the maximum MIMO capacity. Therefore, the applications of MIMO have mostly focused on scatter-rich channel environments which are typically found in terrestrial wireless networks. However, it is possible to maximize the spatial multiplexing gain of MIMO-enabled feeder links of multibeam satellite systems in LOS. This is done through geometric optimization of satellite/gateway antenna-array placements.

FIG. 4 illustrates a 2×2 uplink channel capacity plot 400 associated with a 2×2 MIMO configuration in LOS for a geostationary satellite on the equator at orbital location of 97° W, with onboard antenna spacing of 6 m and a carrier frequency ($f_c$) in the E-band (81-86 GHz) on the uplink in the forward direction. The 2×2 uplink channel capacity plot 400 includes capacities for a SISO uplink 402, a two SISO uplinks 404, and a 2×2 MIMO Uplink 406. For example, the gateway-pair center is placed in North Las Vegas, Nev., with location of 36.4° N and 114.9° W. The CNR is 24 dB. Clearly, the placement of the gateway pair impacts the achievable capacity, cycling through phase alignment, with value at about 10 bits/sec/Hz, to phase orthogonality, peaking at about 18 bits/sec/Hz. The latter is the maximum MIMO capacity obtained when the two signal streams are spatially orthogonal, ensured by the optimally positioned gateway pair. At gateway separation of about 36 Km, the proposed MIMO-enabled feeder link outperforms a state-of-the-art SISO feeder link by a 125% and is 12.5% better than using two SISO feeder links. Also evident is that the displacement of the gateway antennae within an acceptable range 408 of several kilometers around the optimal position 410 of the gateway antennae causes very little reduction in capacity. The 2×2 MIMO Uplink 406 capacity is illustrated as a ribbon to cover the E-band frequency range (81-86 GHz).

Figure 5:
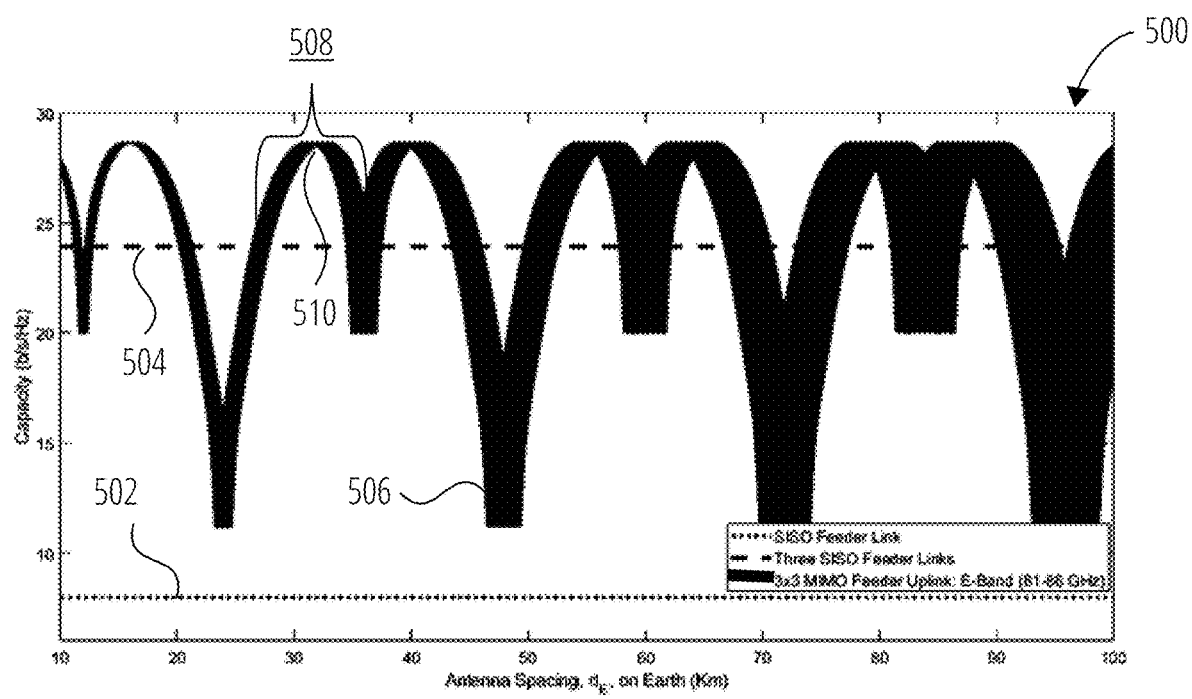
FIG. 5 illustrates a capacity of a 3×3 MIMO as a function of distance between the ground antennae on an uplink in the forward direction according to some embodiments.

FIG. 5 illustrates a capacity of a 3×3 MIMO as a function of distance between the ground antennae on an uplink in the forward direction according to some embodiments.

FIG. 5 illustrates a capacity plot associated with a 3×3 MIMO configuration in LOS for a geostationary satellite on the equator at orbital location of 97° W, with onboard antenna spacing of 6 m and a carrier frequency ($f_c$) in the E-band (81-86 GHz) on the uplink in the forward direction. The 3×3 uplink channel capacity plot 500 includes a SISO uplink 502, a three SISO uplinks 504, a 3×3 MIMO uplink 506, an acceptable range 508, and an optimal position 510. For example, the gateway-trio center is placed in North Las Vegas, Nev., with location of 36.4° N and 114.9° W. The CNR is 24 dB. Clearly, the placement of the gateway trio impacts the achievable capacity, cycling through phase alignment, with value at about 11.2 bits/sec/Hz, to phase orthogonality, peaking at about 29 bits/sec/Hz. The latter is the maximum MIMO capacity obtained when the three signal streams are spatially orthogonal, ensured by the optimally positioned gateway trio. At gateway separation of about 17 Km, the proposed MIMO-enabled feeder link outperforms a state-of-the-art SISO feeder link by a significant 259% and is 20% better than using three SISO feeder links. Also evident is that the displacement of the gateways within acceptable ranges 508 around the optimal positions 510 by several kilometers causes very little reduction in capacity.

Rainfall Effects on MIMO Feeder Uplinks

Figure 6:
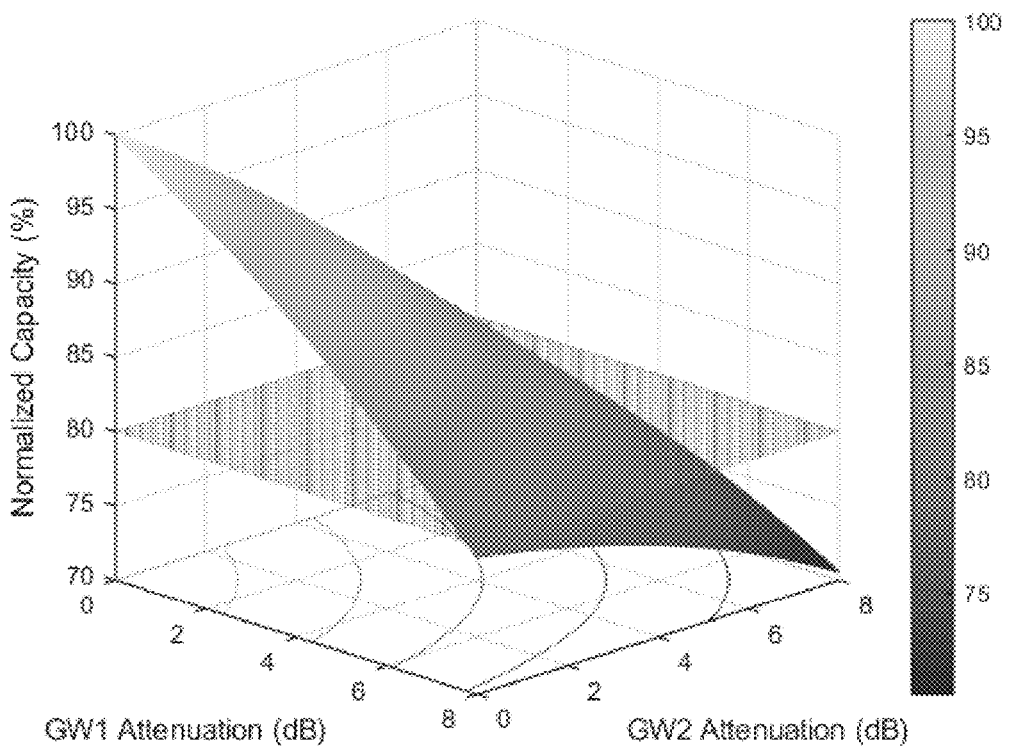
FIG. 6 plots a three-dimensional normalized capacity as a MIMO pair of gateways experience a rainfall event on an uplink in the forward direction according to some embodiments.

FIG. 6 plots a three-dimensional normalized capacity as a MIMO pair of gateways experience a rainfall event on an uplink in the forward direction according to some embodiments.

One advantage of MIMO-enabled feeder links is inherent robustness to rainfall events. This is due to the large gateway separations on the ground, giving rise to diversity effects as the probability of a joint rainfall event affecting all the MIMO gateways is expected to be low. FIG. 6 displays the three-dimensional normalized capacity as the MIMO pair of gateways experience a rainfall events inducing attenuation over a wide range of values with CNR at 24 dB. The gateway placement is optimized under clear-sky conditions and ground-based pre-interference processing is implemented to mitigate MIMO interference for the uplink in the forward direction resulting from the differential attenuations experienced by both sites. The capacity reduction is minimized even as the rain attenuation is 7.5 dB for one of the sites.

Figure 7:
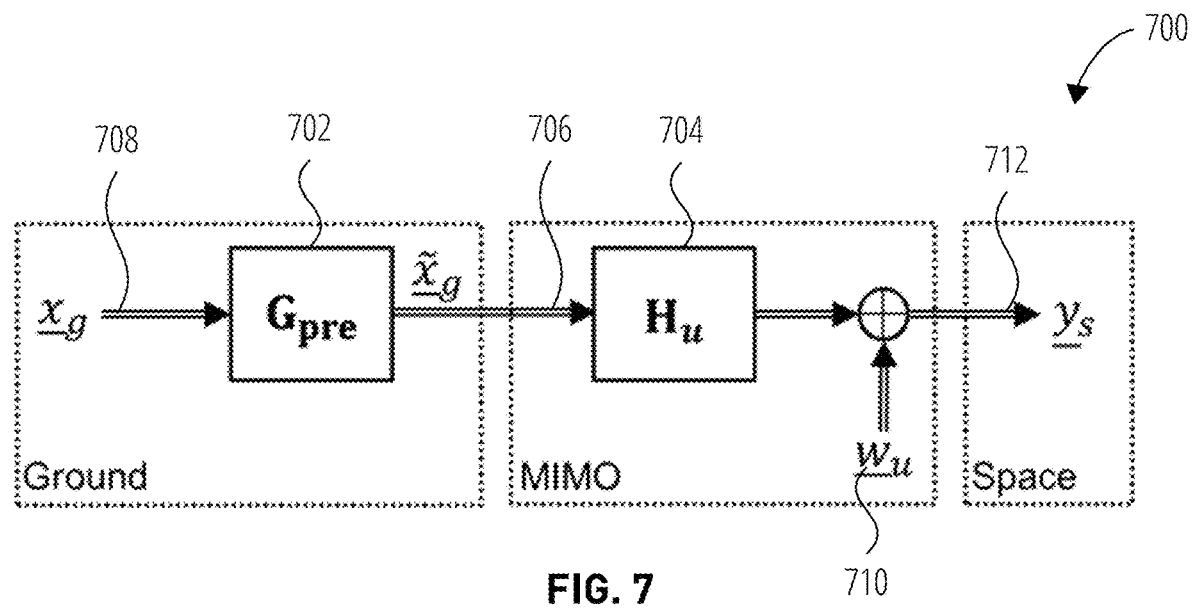
FIG. 7 illustrates a block diagram of ground-based linear pre-interference processing for spatial distinguishability on an uplink portion of a feeder link in a forward direction according to various embodiments.

FIG. 7 illustrates a block diagram of ground-based linear pre-interference processing for spatial distinguishability on an uplink portion of a feeder link in a forward direction according to various embodiments.

The uplink pre-interference processing 700 includes a pre-interference processor 702 and a ground antennae 704. The pre-interference processor 702 receives an antennae uplink signal 706 to generate a GW uplink signal 708 for the ground antennae 704. An AWGN vector 710 may be applied to the 708 and received as a MIMO transmission 712 after traversing the space between the ground antennae 704 and satellite antennae (not shown).

In general, the system model for the feeder link on the uplink in the forward direction incorporates a MIMO system with $N_T$ transmit gateway antennae and $N_R$ receive satellite antennae, accompanied by additive white Gaussian noise (AWGN) vector $w_u$. This can be mathematically expressed as Expression 202, where $y_S$ is an $N_R \times 1$ complex-valued vector received at the satellite antennae and $x_g$ of size $N_T \times 1$, is the vector of signals transmitted by the gateway antennae. In expression 202, the matrix $H_u$ represents the MIMO system in LOS whose entries are computed based on the free-space wave propagation as expression 204 where $\lambda_c = c_0/f_c$ is the wavelength associated with the uplink carrier frequency $f_c$, $a_{m,n}$ is the propagation attenuation, or $a_{m,n} = \lambda_c/(4\pi r_{m,n})$ and $r_{m,n}$ is the distance between the nth transmit antenna and the mth receive antenna.

The capacity $C_u$ of such a MIMO-enabled system may be given by expression 206, where $I_{N_R}$ is the identity matrix and $\rho_u$ is the carrier-to-noise ratio (CNR) on the uplink in the forward direction.

In order to extract the spatial multiplexing gain with minimal increase of the satellite complexity, the present teachings pre-correct the transmitted symbol vector $x_g$ at a pre-interference processor 702 via a linear operation, for example, by multiplying the transmitted symbol vector $x_g$ with a matrix $G_{pre}$. Mathematically speaking, antennae uplink signal 706 $\tilde{x}_g$ rather than $x_g$, as in expression 208. y substituting expression 208 into expression 202, the received vector of symbols experience a cascaded channel effect marked by $(H_u \blacksquare G_{pre})$ per expression 210.

When the gateways are placed at their orthogonal positions $G_{pre} = H_u^H$. This is so as the cascaded channel effect in this case, $(H_u H_u^H)$ is diagonal following the capacity-maximizing geometric optimization of the satellite/gateway placement. This may ensure that the transmitted signals may be spatially distinguished at the receive satellite antenna, without needing matrix multiplication onboard the satellite.

If residual MIMO interference remains at the satellite, for example, due to the gateways not being placed at orthogonal positions, other criteria may be used to obtain $G_{pre}$ such as those based on the zero-forcing (ZF), the minimum mean-square error (MMSE) criteria, or regularized ZF (RZF), expressed, respectively, expression 212, expression 214 and expression 216. Weighting can also be applied to the expression 212, expression 214 and expression 216 to provide weighted sum capacity.

The ground-based linear pre-interference processing minimizes satellite complexity. This may enable MIMO in LOS with existing satellite bent-pipe design or one with a transparent payload. The MIMO-enabled feeder links may operate with more advanced satellites with on-board processing and ones with regenerative payloads. The pre-interference processing generates the transmit signals for the uplink. The pre-interference processing may be inter-connected to the gateways via fiber or through microwave links, while ensuring time and phase alignment of the ground antennae. High-quality channel state information (CSI) about the propagation rays may be available at the gateways. This can be done, for example, by deploying channel sounding using calibration sequences that are orthogonal.

Ground-Based Post-Interference Processing for the Downlink

Figure 8:
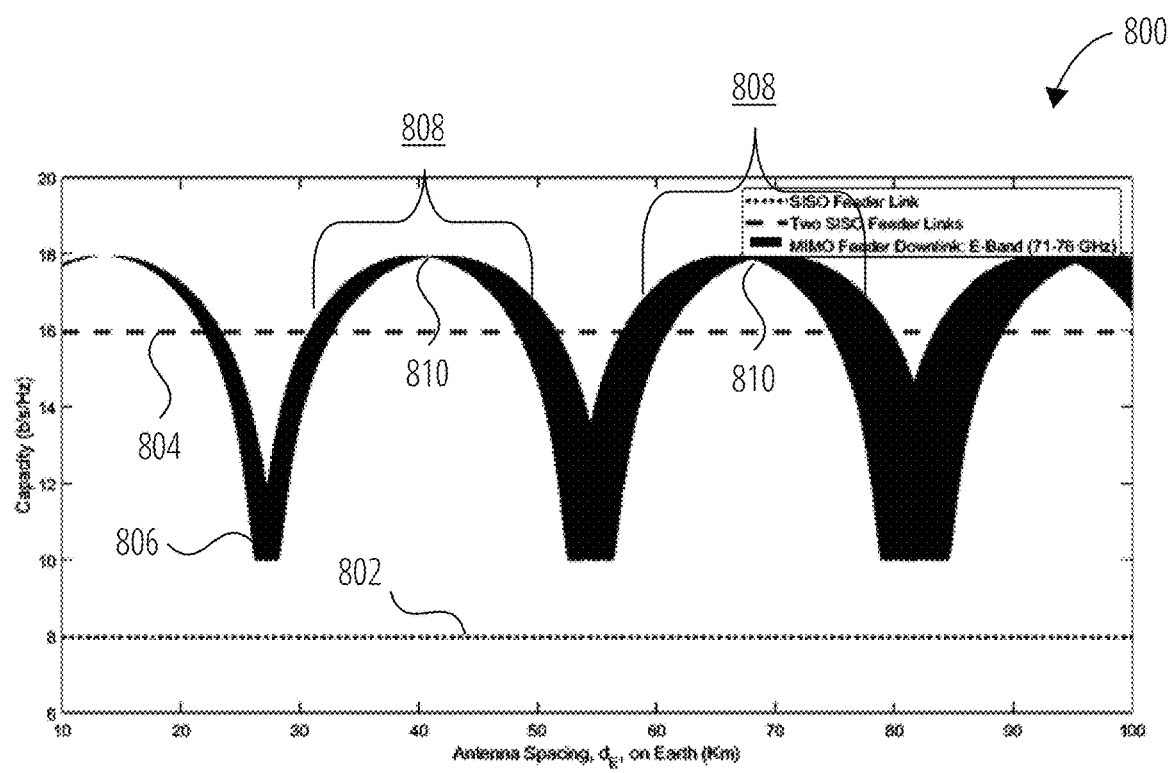
FIG. 8 illustrates a capacity of a 2×2 MIMO as a function of distance between the ground antennae on a downlink in the return direction according to some embodiments.

FIG. 8 illustrates a capacity of a 2×2 MIMO as a function of distance between the ground antennae on a downlink in the return direction according to some embodiments.

FIG. 8 illustrates a capacity associated with a 2×2 MIMO configuration in LOS for a geostationary satellite on the equator at orbital location of 97° W, with onboard antenna spacing of 6 m and $f_c$ in the E-band (71-76 GHz) on the downlink in the return direction. The 2×2 downlink channel capacity plot 800 includes a SISO downlink 802, a two SISO downlinks 804, a 2×2 MIMO downlink 806, an acceptable range 808, and an optimal position 810. For example, the gateway-pair center is placed in North Las Vegas, Nev., with location of 36.4° N and 114.9° W. The CNR is 24 dB. Clearly, the placement of the gateway pair impacts the achievable capacity, cycling through phase alignment, with value at about 10 bits/sec/Hz, to phase orthogonality, peaking at about 18 bits/sec/Hz. The latter is the maximum MIMO capacity obtained when the two signal streams are spatially orthogonal, ensured by the optimally positioned gateway pair. At gateway separation of about 41 Km, the proposed MIMO-enabled feeder link outperforms a state-of-the-art SISO feeder link by a tremendous 125% and is 12.5% better than using two SISO feeder links. The displacement of the gateways within an acceptable ranges 808 around the optimal positions 810 by several kilometers causes very little reduction in capacity. 2×2 MIMO downlink 806 is illustrated as a ribbon to cover the E-band frequency range (71-76 GHz).

Figure 9:
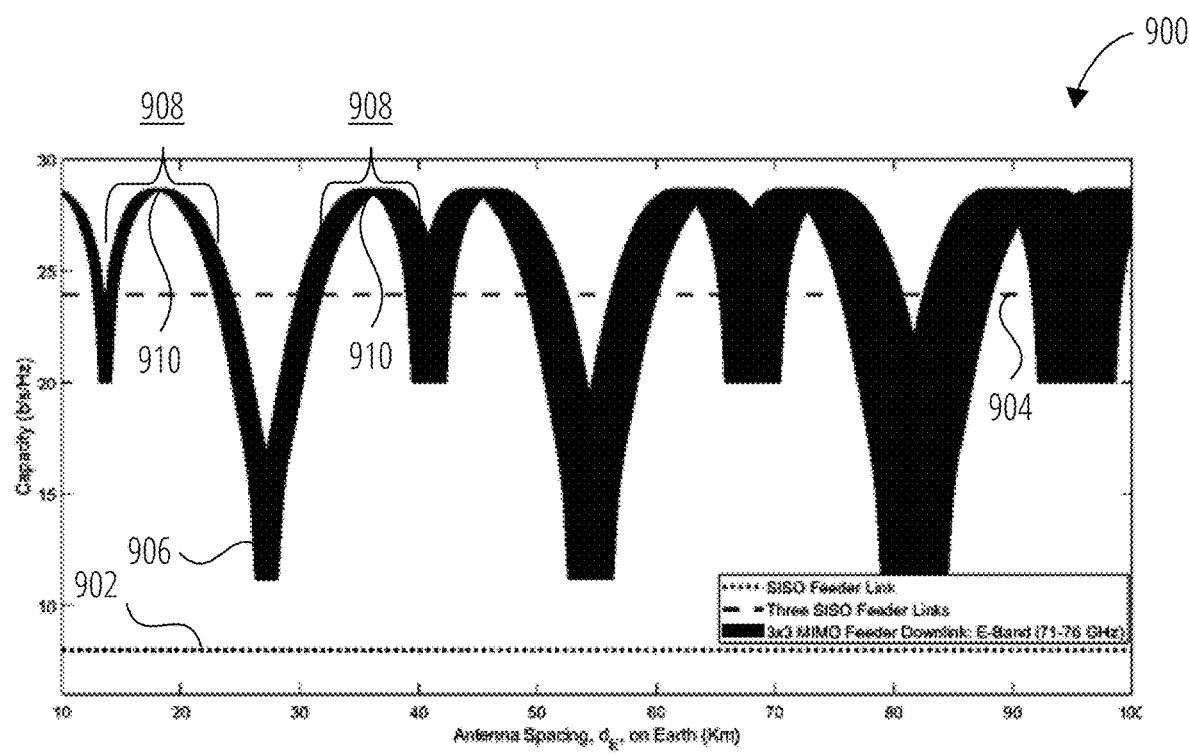
FIG. 9 illustrates a capacity of a 3×3 MIMO as a function of distance between the ground antennae on a downlink in the return direction according to some embodiments.

FIG. 9 illustrates a capacity of a 3×3 MIMO as a function of distance between the ground antennae on a downlink in the return direction according to some embodiments.

FIG. 9 displays the capacity associated with a 3×3 MIMO configuration in LOS for a geostationary satellite on the equator at orbital location of 97° W, with onboard antenna spacing of 6 m and $f_c$ in the E-band (71-76 GHz) on the downlink in the return direction. The 3×3 downlink channel capacity plot 900 includes a SISO downlink 902, a three SISO downlinks 904, a 3×3 MIMO downlink 906, an acceptable range 908, and an item 910. For example, the gateway-trio center is placed in North Las Vegas, Nev., with location of 36.4° N and 114.9° W. The CNR is 24 dB. Clearly, the placement of the gateway trio impacts the achievable capacity, cycling through phase alignment, with value at about 11.2 bits/sec/Hz, to phase orthogonality, peaking at about 29 bits/sec/Hz. The latter is the maximum MIMO capacity obtained when the three signal streams are spatially orthogonal, ensured by the optimally positioned gateway trio. At gateway separation of about 36 Km, the proposed MIMO-enabled feeder link outperforms a state-of-the-art SISO feeder link by a significant 259% and is 20% better than using three SISO feeder links. Also evident is that the displacement of the gateways around the optimal positions by several kilometers causes very little reduction in capacity.

Rainfall Effects on MIMO Feeder Downlinks

Figure 10:
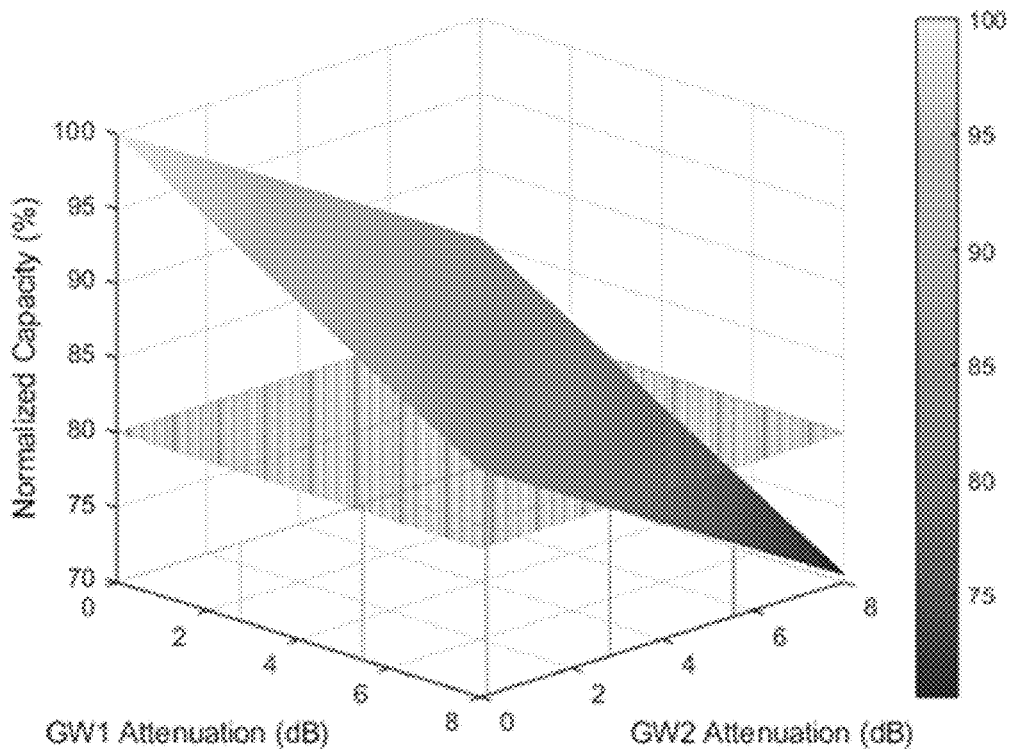
FIG. 10 plots a three-dimensional normalized capacity as a MIMO pair of gateways experience a rainfall event on a downlink in a return direction according to some embodiments.

FIG. 10 plots a three-dimensional normalized capacity as a MIMO pair of gateways experience a rainfall event on a downlink in a return direction according to some embodiments.

One advantage of MIMO-enabled feeder links is their inherent robustness to rainfall events. This is due to the large gateway separations on the ground, giving rise to diversity effects as the probability of a joint rainfall event affecting all the MIMO gateways is expected to be low. FIG. 10 displays the three-dimensional normalized capacity as the MIMO pair of gateways experience a rainfall events inducing attenuation over a wide range of values with CNR at 24 dB. The gateway placement is optimized under clear-sky conditions and ground-based post-interference processing is implemented to mitigate MIMO interference for the downlink in the return direction resulting from the differential attenuations experienced by both sites. The capacity reduction is minimized even as the rain attenuation is 7.5 dB for one of the sites.

Figure 11:
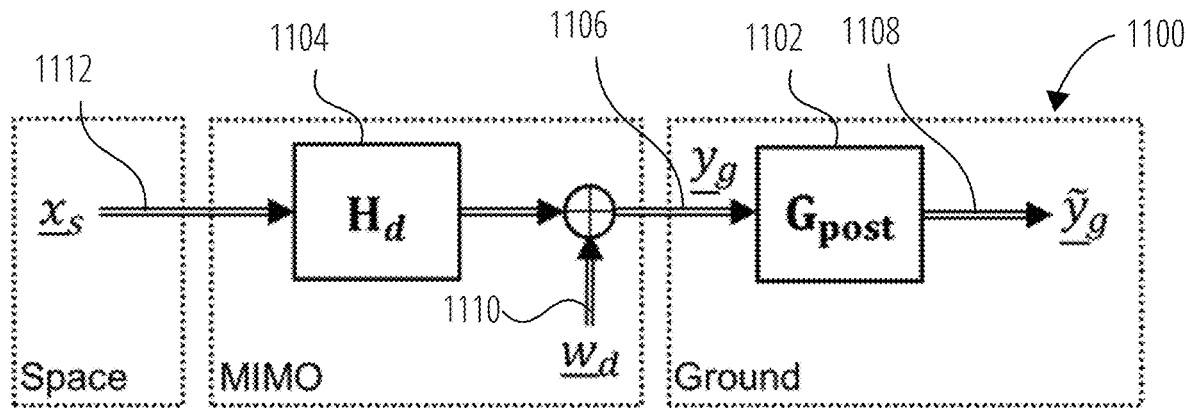
FIG. 11 illustrates a block diagram of ground-based linear post-interference processing for spatial distinguishability on a downlink portion of a feeder link in a return direction according to various embodiments.

FIG. 11 illustrates a block diagram of ground-based linear post-interference processing for spatial distinguishability on a downlink portion of a feeder link in a return direction according to various embodiments.

The downlink post-interference processing 1100 includes a post-interference processor 1102, satellite antennae 1104, antennae downlink signals 1106 that are processed by the post-interference processor 1102 to generate GW downlink signals 1108. The satellite antennae 1104 may receive and output MIMO receptions 1112. An AWGN vector 1110 may be applied to outputs of satellite antennae 1104 in order to obtain antennae downlink signals 1106.

In general, the system model for the feeder link on the downlink in the return direction incorporates a MIMO system with $N_T$ transmit satellite antennae and $N_R$ receive gateways antennae, accompanied by additive white Gaussian noise (AWGN) vector $w_d$. This can be mathematically expressed as expression 218, where $y_g$ is an $N_R \times 1$ complex-valued vector received at the gateway antennae and $x_s$, of size $N_T \times 1$, is the vector of signals transmitted by the satellite antennae. In expression 218, the matrix Ha represents the MIMO system in LOS whose entries are computed based on the free-space wave propagation as expression 220, where $\lambda_c = c_0/f_c$ is the wavelength associated with the downlink carrier frequency $f_c$, $a_{m,n}$ is the propagation attenuation, or $a_{m,n} = \lambda_c/(4\pi r_{m,n})$ and $r_{m,n}$ is the distance between the nth transmit antenna and the mth receive antenna.

The capacity $C_d$ of such a MIMO-enabled system is given by expression 222 where $I_{N_R}$ is the identity matrix and $\rho_d$ is the CNR on the downlink in the return direction.

In order to extract the spatial multiplexing gain with minimal increase of the satellite complexity, the received symbol vector $y_g$ is post-processed by the post-interference processor 1102 via a linear operation involving multiplying by matrix $G_{post}$. This ground-based linear post-interference processing is displayed in FIG. 11, focusing on the case of equal number of transmit and receive antennae. Mathematically speaking, the present teachings generate GW downlink signals 1108 $\tilde{y}_g$ instead, as in expression 224. By applying expression 224 to expression 218, the received vector of symbols experience a cascaded channel effect that is marked by $(G_{post} \blacksquare H_d)$, or expression 226.

When the gateways are placed at their optimal orthogonal positions, then $G_{post} = H_d^H$. This is so as the cascaded channel effect in this case, $(H_d^H H_d = H_d H_d^H)$, is diagonal following the capacity-maximizing geometric optimization of the satellite/gateway placement. This choice of $G_{post}$ ensures that the transmitted signals may be spatially distinguished at the receive gateway antenna, without needing matrix multiplication onboard the satellite.

If residual MIMO interference remains due to reasons such as the gateways are not placed at their optimal orthogonal positions, other criteria can be used to obtain $G_{post}$ such as those based on the zero-forcing (ZF), the minimum mean-square error (MMSE) criteria, or regularized ZF (RZF), expressed, respectively, as expression 228, expression 230 and expression 232. Weighting may be applied to expression 228, expression 230 and expression 232 to provide weighted sum capacity.

The proposed ground-based linear post-interference processing minimizes the impact on the satellite complexity, enabling MIMO in LOS with existing satellite bent-pipe design or one with a transparent payload. The proposed MIMO-enabled feeder links can operate with more advanced satellite with on-board processing and ones with regenerative payloads. The post-interference processing is responsible for the generation of the received signals. Post-interference processing may be inter-connected to the gateways participating in the MIMO setup terrestrially via fiber or through microwave links, while ensuring time and phase alignment of the ground antennae. High-quality channel state information (CSI) about the propagation rays may be available at the gateways, for example, by deploying channel sounding using calibration sequences that are orthogonal.

Figure 12:
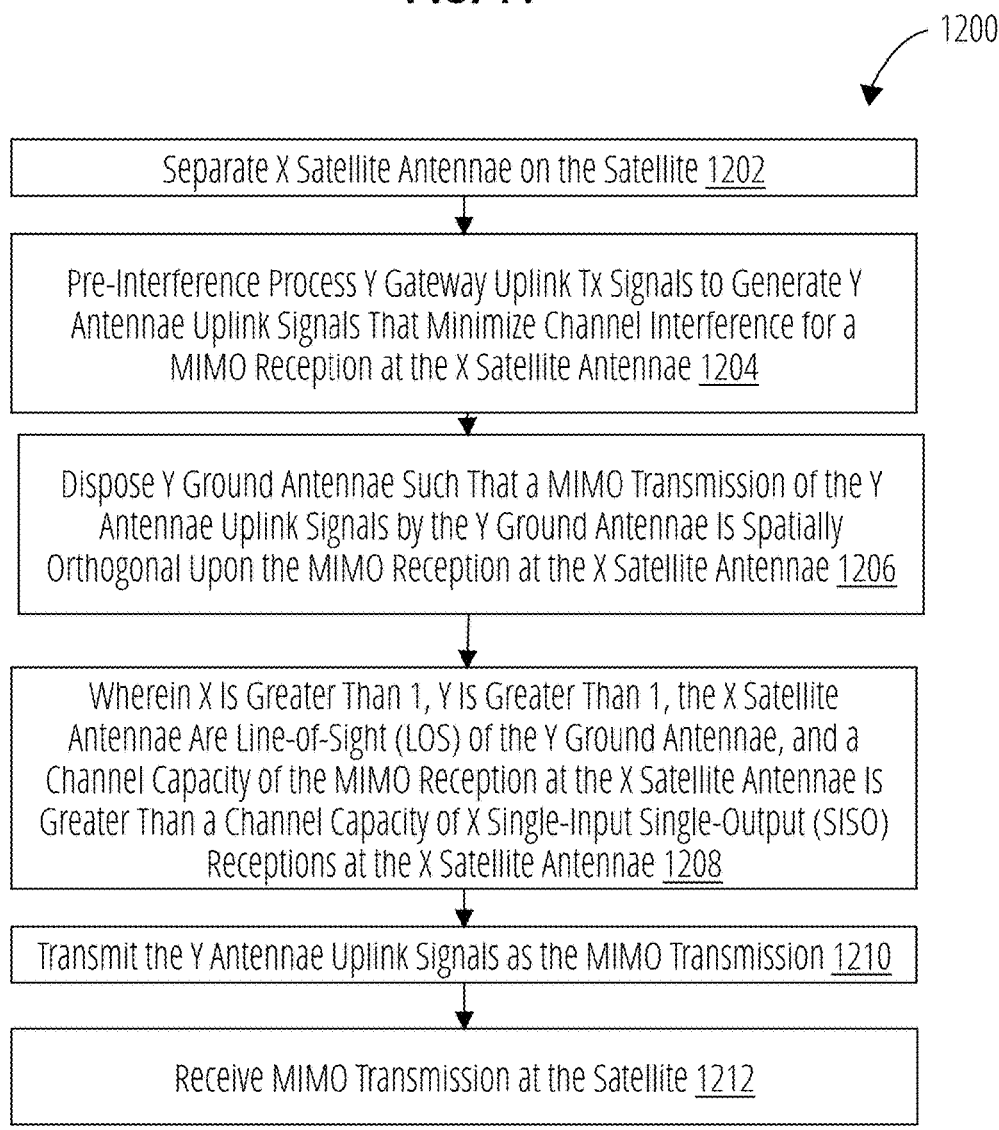
FIG. 12 illustrates a Method 1200 for providing Multi-Input Multi-Output (MIMO) feeder uplinks for a satellite in accordance with one embodiment.

FIG. 12 illustrates a method for providing Multi-Input Multi-Output (MIMO) feeder uplinks for a satellite according to various embodiments.

FIG. 12 illustrates a method 1200 for providing MIMO uplinks for a satellite. In operation 1202, Method 1200 separates X satellite antennae on the satellite. In operation 1204, Method 1200 pre-interference processes Y gateway uplink Tx signals to generate Y antennae uplink signals that minimize channel interference for a MIMO reception at the X satellite antennae. In operation 1206, Method 1200 disposes Y ground antennae such that a MIMO transmission of the Y antennae uplink signals by the Y ground antennae is spatially orthogonal upon the MIMO reception at the X satellite antennae. In Method 1200, at 1208, X is greater than 1, Y is greater than 1, the X satellite antennae are line-of-sight (LOS) of the Y ground antennae, and a channel capacity of the MIMO reception at the X satellite antennae is greater than a channel capacity of X Single-Input Single-Output (SISO) receptions at the X satellite antennae. In operation 1210, Method 1200 transmits the Y antennae uplink signals as the MIMO transmission. In operation 1212, Method 1200 may receive a MIMO transmission at the satellite.

Figure 13:
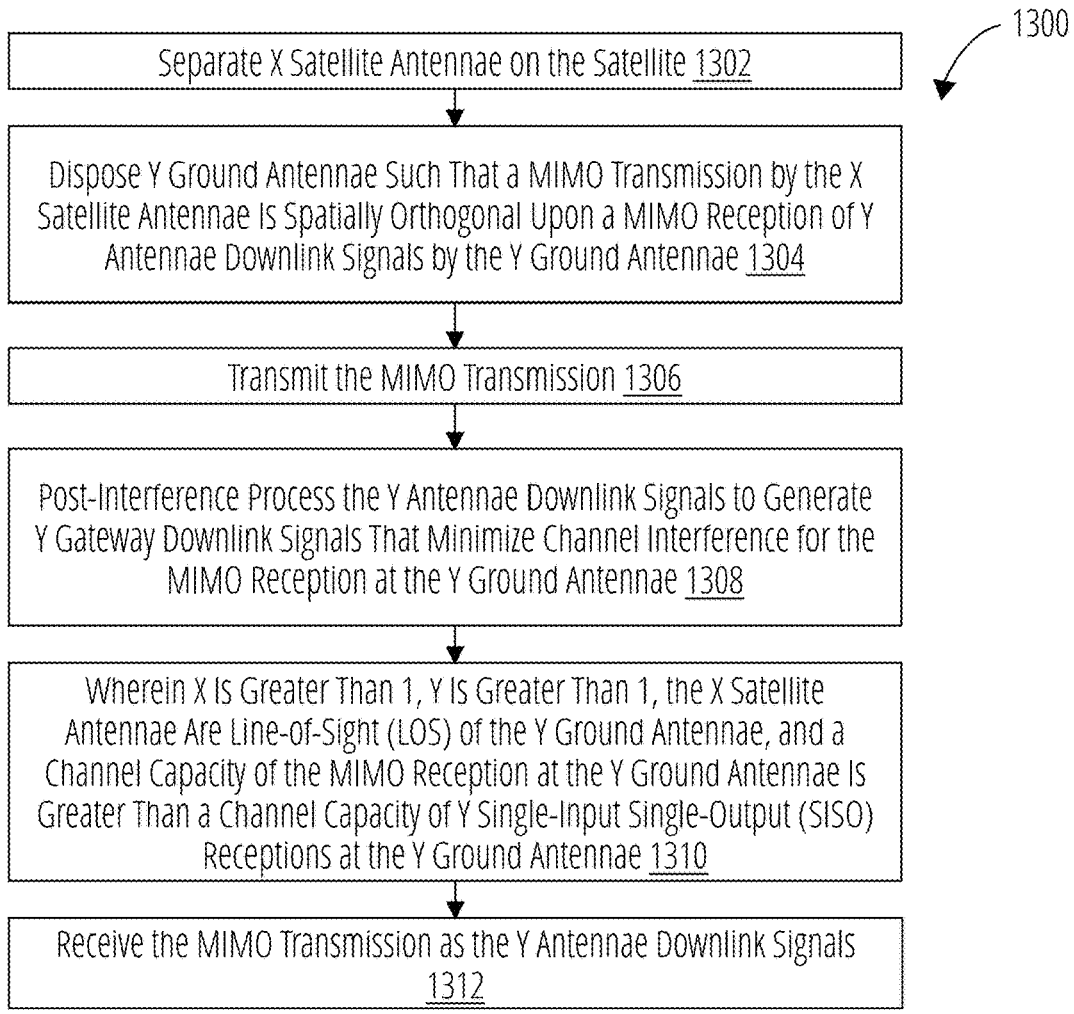
FIG. 13 illustrates a method 1300 for providing Multi-Input Multi-Output (MIMO) feeder downlinks for a satellite in accordance with one embodiment.

FIG. 13 illustrates a method for providing Multi-Input Multi-Output (MIMO) feeder uplinks for a satellite according to various embodiments.

FIG. 13 illustrates a method 1300 for providing MIMO downlinks for a satellite. In operation 1302, method 1300 separates X satellite antennae on the satellite. In operation 1304, method 1300 disposes Y ground antennae such that a MIMO transmission by the X satellite antennae is spatially orthogonal upon a MIMO reception of Y antennae downlink signals by the Y ground antennae. In Operation 1306, method 1300 transmits the MIMO transmission via the X satellite antennae. In operation 1308, method 1300 post-interference processes the Y antennae downlink signals to generate Y gateway downlink signals that minimize channel interference for the MIMO reception at the Y ground antennae. In method 1300, at 1310, X is greater than 1, Y is greater than 1, the X satellite antennae are line-of-sight (LOS) of the Y ground antennae, and a channel capacity of the MIMO reception at the Y ground antennae is greater than a channel capacity of Y Single-Input Single-Output (SISO) receptions at the Y ground antennae. In operation 1312, method 1300 may receive the MIMO transmission as the Y antennae downlink signals.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for providing Multi-Input Multi-Output (MIMO) feeder uplinks for a satellite, the method comprising:
   separating X satellite antennae on the satellite;
   pre-interference processing Y gateway uplink transmit signals to generate Y antennae uplink signals that minimize channel interference for a MIMO reception at the X satellite antennae;
   disposing Y ground antennae in a manner that a MIMO transmission of the Y antennae uplink signals by the Y ground antennae is spatially orthogonal upon the MIMO reception at the X satellite antennae; and
   pre-correcting the Y antennae uplink signals, based on the disposing of the Y ground antennae and the satellite, in a manner that the MIMO reception at the X satellite antennae experiences a cascaded channel effect,
   wherein X is greater than 1, Y is greater than 1, the X satellite antennae are dominant line-of-sight (LOS) of the Y ground antennae, and a channel capacity of the MIMO transmission is greater than a channel capacity of Y Single-Input Single-Output (SISO) transmissions.

2. The method of claim 1, further comprising transmitting the Y antennae uplink signals as the MIMO transmission; and receiving the MIMO transmission at the satellite.

3. The method of claim 1, wherein the pre-interference processing is based on one or more of, a weighted or non-weighted version of, a zero-forcing (ZF) criteria, a minimum mean-square error (MMSE) criteria, or a regularized ZF (RZF) criteria.

4. The method of claim 1, wherein the Y ground antennae are spaced within an acceptable range of an optimal position.

5. The method of claim 1, wherein the satellite comprises one Geosynchronous Earth Orbit (GEO) satellite having a bent-pipe design, an on-board processing design, a transparent payload design, a regenerative payload design or a combination thereof.

6. The method of claim 1, wherein X and Y are equal.

7. The method of claim 1, wherein the pre-interference processing mitigates interference in a presence of an additive white Gaussian noise (AWGN) vector.

8. The method of claim 1, where the pre-interference processing is based on a linear operation multiplying the Y antennae uplink signals with a matrix or a linear combination of the Y antennae uplink signals.

9. The method of claim 1, wherein the Y ground antennae are interconnected via a fiber or microwave link.

10. The method of claim 1, wherein the pre-interference processing is based on high-quality channel state information (CSI) about a propagation of the MIMO transmission.

* * * * *